United States Patent

Suzuki

(10) Patent No.: US 6,674,476 B1
(45) Date of Patent: Jan. 6, 2004

(54) OUTDOOR HOUSING FOR TV CAMERA

(75) Inventor: Akihiro Suzuki, Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 09/337,556

(22) Filed: Jun. 22, 1999

(30) Foreign Application Priority Data

Jun. 26, 1998 (JP) .......................... 10-180412

(51) Int. Cl.[7] .......................... H04N 5/225; H04N 9/47; H02P 7/00; G05B 5/00
(52) U.S. Cl. .......................... 348/375; 348/373; 348/143; 318/444; 318/483
(58) Field of Search .......................... 348/373, 375, 348/143, 207.99; 396/427, 114; 318/444, 483, 466

(56) References Cited

U.S. PATENT DOCUMENTS

| | | | | |
|---|---|---|---|---|
| 4,736,218 A | * | 4/1988 | Kutman | 348/143 |
| 4,821,043 A | * | 4/1989 | Leavitt | 343/765 |
| 5,177,606 A | * | 1/1993 | Koshizawa | 348/118 |
| 5,694,012 A | * | 12/1997 | Pientka et al. | 318/444 |
| 5,969,493 A | * | 10/1999 | Pientka et al. | 318/444 |
| 6,057,660 A | * | 5/2000 | Meier et al. | 318/444 |
| 6,175,205 B1 | * | 1/2001 | Michenfelder et al. | 318/444 |

FOREIGN PATENT DOCUMENTS

| | | | | |
|---|---|---|---|---|
| DE | 43 32 105 A1 | 3/1995 | | |
| DE | 295 14 364 U1 | 2/1996 | | |
| DE | 44 36 087 A1 | 4/1996 | | |
| DE | 691 23 212 T2 | 4/1997 | | |
| DE | 197 00 665 A1 | 7/1997 | | |
| JP | 03-016856 A | * 1/1991 | | B60S/1/02 |
| JP | 05-167897 | * 7/1993 | | H04N/5/225 |
| JP | 07-198091 | * 8/1995 | | F16M/11/04 |
| JP | 09-292656 | * 11/1997 | | G03B/17/56 |
| JP | 10-118584 | * 5/1998 | | B08B/3/02 |
| JP | 10-258704 A | * 9/1998 | | B60S/1/02 |

* cited by examiner

Primary Examiner—Wendy R. Garber
Assistant Examiner—Lin Ye
(74) Attorney, Agent, or Firm—Birch, Stewart, Kolasch & Birch, LLP

(57) ABSTRACT

A housing for a TV camera has an automatic wiping mode for automatically driving a wiper, which is provided at a front window of the housing, at predetermined time intervals. The execution of the automatic wiping mode while the TV camera is unused prevents a large amount of snow and frost, etc. from adhering to the front window. The wiper and two nozzles of a window-washing device for jetting a washing liquid are provided on the front window of the housing in a pan/tilt head. If the pan/tilt head is set to the automatic wiping mode, the wiper and the window-washing device automatically operate at predetermined time intervals. This prevents the snow and the frost from adhering to the front window while the pan/tilt head is not operated, e.g., at night. Thus, the shooting can be begun quickly when the need arises.

17 Claims, 6 Drawing Sheets

OUTDOOR HOUSING FOR TV CAMERA

BACKGROUND OF THE INVENTION

1. Field of the Invention

The present invention relates generally to a housing for a TV camera, and more particularly to a housing for a TV camera, which is applied to an outdoor pan/tilt head and has a wiper at a front window thereof.

2. Description of Related Art

Conventionally, a remote-control pan/tilt head is used to remotely control operation of a TV camera over a telephone line, etc. when the TV camera is placed outdoors. The remote-control pan/tilt head includes a housing for the TV camera, and the housing protects the TV camera placed outdoors from rain, snow, dust, etc. The TV camera enclosed in the housing captures pictures through a transparent front window provided at the front of the housing.

The front window has a wiper for wiping off rain, dust, etc., from the front window to secure a field of view of the TV camera, and the front window may also have a conductive film heater for heating the front window to prevent adhesion of snow, frost, or the like. By the passage of an electric current through the conductive film heater, it heats the front window and melts the snow and the frost.

The conductive film heater, however, has a limited ability to heat. If a large amount of snow and/or frost covers the front window or the atmospheric temperature is extremely low; the conductive film heater cannot satisfactorily remove the snow and the frost from the front window. If the ability to heat of the conductive film heater is increased to the maximum, a large amount of electricity is consumed.

The wiper at the front window can somewhat wipe off the snow and the frost from the front window. After a certain amount of snow and/or frost covers the front window, however, the wiper cannot operate correctly to remove the snow and the frost from the front window.

Therefore, the operator must wait for the snow or the frost to melt naturally if a large amount of snow or frost covers to the front window. Alternatively, the operator must go to the pan/tilt head to remove the snow or the frost manually. Consequently, the operator misses a good opportunity to shoot.

SUMMARY OF THE INVENTION

In view of the foregoing, it is an object of the present invention to provide a housing for a TV camera, which prevents a large amount of snow and frost from adhering to a window of the housing if the TV camera is placed outdoors, and makes it possible to start shooting immediately as need arises.

To achieve the above-mentioned object, the present invention is directed to a housing for a TV camera, comprising: a box for containing the TV camera, the box having a window through which the TV camera captures an image; a wiper for wiping the window; a motor for driving the wiper; a commanding device for commanding execution of an automatic wiping mode to automatically control the wiper; and a wiper controller for operating the wiper at predetermined time intervals by the motor in the automatic wiping mode.

According to the present invention, the housing for the TV camera with the wiper disposed at the window to secure the visual field of the TV camera stored therein, has the automatic wiping mode for automatically operating the wiper at the predetermined time intervals. Therefore, even if the TV camera with the housing is placed outdoors and is remained unused while the snow is falling or the temperature is low, it is possible to prevent a large amount of snow and frost from adhering to the window of the housing with only a small amount of electricity by executing the functions of the automatic wiping mode, thus securing a satisfactory field of view even at an unexpected imaging. Therefore, the operator never misses a good opportunity to shoot.

Preferably, the wiper controller reciprocates the wiper at least once in each of operations of the wiper at the predetermined time intervals. Moreover, the housing for the TV camera further comprises at least one of: a temperature sensor for sensing an atmospheric temperature or a temperature of the window, and a load measuring device for measuring a load applied to the motor; wherein the wiper controller automatically increases or decreases a number of wiper reciprocation times in each of the operations of the wiper in accordance with the atmospheric temperature or the temperature of the window sensed by the temperature sensor, or in accordance with the load measured by the load measuring apparatus.

Preferably, the housing for the TV camera further comprises: a washing device for jetting a washing liquid to the window; wherein the wiper controller drives the washing device to jet the washing liquid to the window when the wiper is driven.

According to the present invention, the washing liquid is jetted to the window in synchronism with the activation of the wiper in the automatic wiping mode. This enables the wiper to easily wipe off the snow and the frost from the window, and prevents the window from being scratched with dust, etc.

Preferably, the housing for the TV camera further comprises at least one of: a temperature sensor for sensing an atmospheric temperature or a temperature of the window, a water detector for detecting water on the window, a shooting operation detector for detecting that the TV camera is shooting, a manual operation detector for detecting that the housing is manually operated, and a load measuring device for measuring a load applied to the motor; wherein the wiper controller temporarily stops driving the wiper or finishes the automatic wiping mode when the atmospheric temperature or the temperature of the window sensed by the temperature sensor is above a preset temperature, when the water detector detects no water on the window, when the shooting operation detector detects that the TV camera is shooting, when the manual operation detector detects that the housing is manually operated, or when the load applied to the motor measured by the load measuring device is below a predetermined value.

Preferably, the housing for the TV camera further comprises at least one of: a temperature sensor for sensing an atmospheric temperature or a temperature of the window, and a water detector for detecting water on the window; wherein the wiper controller starts the automatic wiping mode when the atmospheric temperature or the temperature of the window sensed by the temperature sensor is below a preset temperature, or when the water detector detects water on the window.

Preferably, the housing for the TV camera further comprises at least one of: a temperature sensor for sensing an atmospheric temperature or a temperature of the window, and a water detector for detecting water on the window; wherein the wiper controller automatically increases or decreases the predetermined time intervals in accordance with the atmospheric temperature or the temperature of the window sensed by the temperature sensor, or in accordance with presence of the water on the window detected by the water detector.

According to the present invention, the wiper may be driven in the automatic wiping mode in accordance with not only the time but also the atmospheric temperature or the temperature of the window, the presence of water on the window, or the like. Even in the automatic wiping mode, the wiper is only driven as the need arises when the temperature is relatively low, the water is detected, or the like. This reduces the consumption of electricity.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
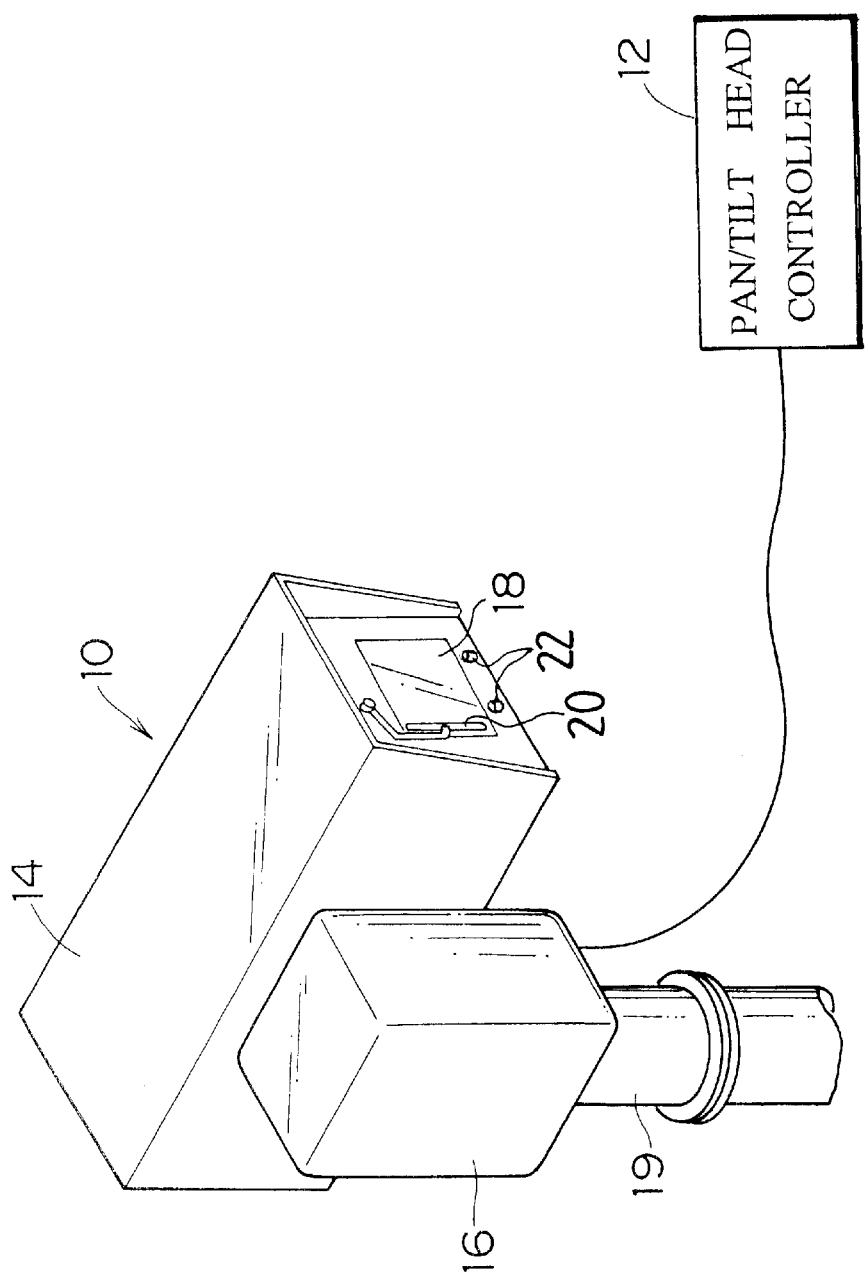
FIG. 1 is a view showing the entire structure of a remote-control pan/tilt head, to which a preferred embodiment of a housing of the present invention is applied.

FIG. 1 shows the entire structure of a remote-control pan/tilt head to which a housing according to a preferred embodiment of the present invention is applied. As shown in FIG. 1, the remote-control pan/tilt head comprises a pan/tilt head 10 and a pan/tilt head remote controller 12, which is connected to the pan/tilt head 10 through a cable. The pan/tilt head 10 comprises a housing 14 for a TV camera (not shown) and a pan/tilt head body 16 for supporting the housing 14.

A transparent front window 18 is provided at the front of the housing 14, and the TV camera in the housing 14 captures pictures through the front window 18.

A wiper 20 is provided at the front window 18 of the housing 14. The wiper 20 reciprocates on the surface of the front window 18 to wipe off water, dust, etc. from the front window 18. The wiper 20 is also used for preventing a large amount of snow, frost, etc. from adhering to the front window 18 in cold districts etc. as described later.

A window-washing device is provided in the housing 14, and a pair of nozzles 22 is provided at the front of the housing 14 in order to jet washing liquid to the front window 18. To clean the front window 18, the window-washing device is driven to jet the washing liquid to the front window 18 through the nozzles 22, and the wiper 20 is then driven to wipe the front window 18. The washing liquid is preferably an antifreeze-type. If the snow or the frost adheres to the front window 18, the jetting of the washing liquid can defrost them to some extent. After the washing liquid is jetted, the wiper 20 can easily wipe off the snow or the frost from the front window 18.

The housing 14 is supported on a tilt shaft (not shown) extending from the pan/tilt head body 16. The tilt shaft is rotated by a tilt motor (not shown), which is provided in the pan/tilt head body 16. The pan/tilt head body 16 is supported on a pan shaft 19, which is fixed to a base (not shown). The pan/tilt head body 16 is rotated on the pan shaft 19 by a pan motor (not shown), which is provided in the pan/tilt head body 16. It is therefore possible to remotely control the tilting and panning positions of the TV camera by transmitting command signals from the pan/tilt head controller 12 to drive the tilt motor and the pan motor to tilt and pan the housing 14.

The pan/tilt head controller 12 has a variety of control members. The operator operates a desired control member of the pan/tilt head controller 12, which transmits a desired command to the pan/tilt head 10 to control the pan/tilt head 10. For example, a shooting direction of the TV camera can be controlled by running the pan motor and/or the tilt motor of the pan/tilt head 10 by operating the pan/tilt head controller 12. A focusing and a zooming of the TV camera can be controlled by running a focus motor and a zoom motor of the TV camera by operating the pan/tilt head controller 12. The wiper 20 and the window-washing device can also be driven by operating the pan/tilt head controller 12.

Figure 2:
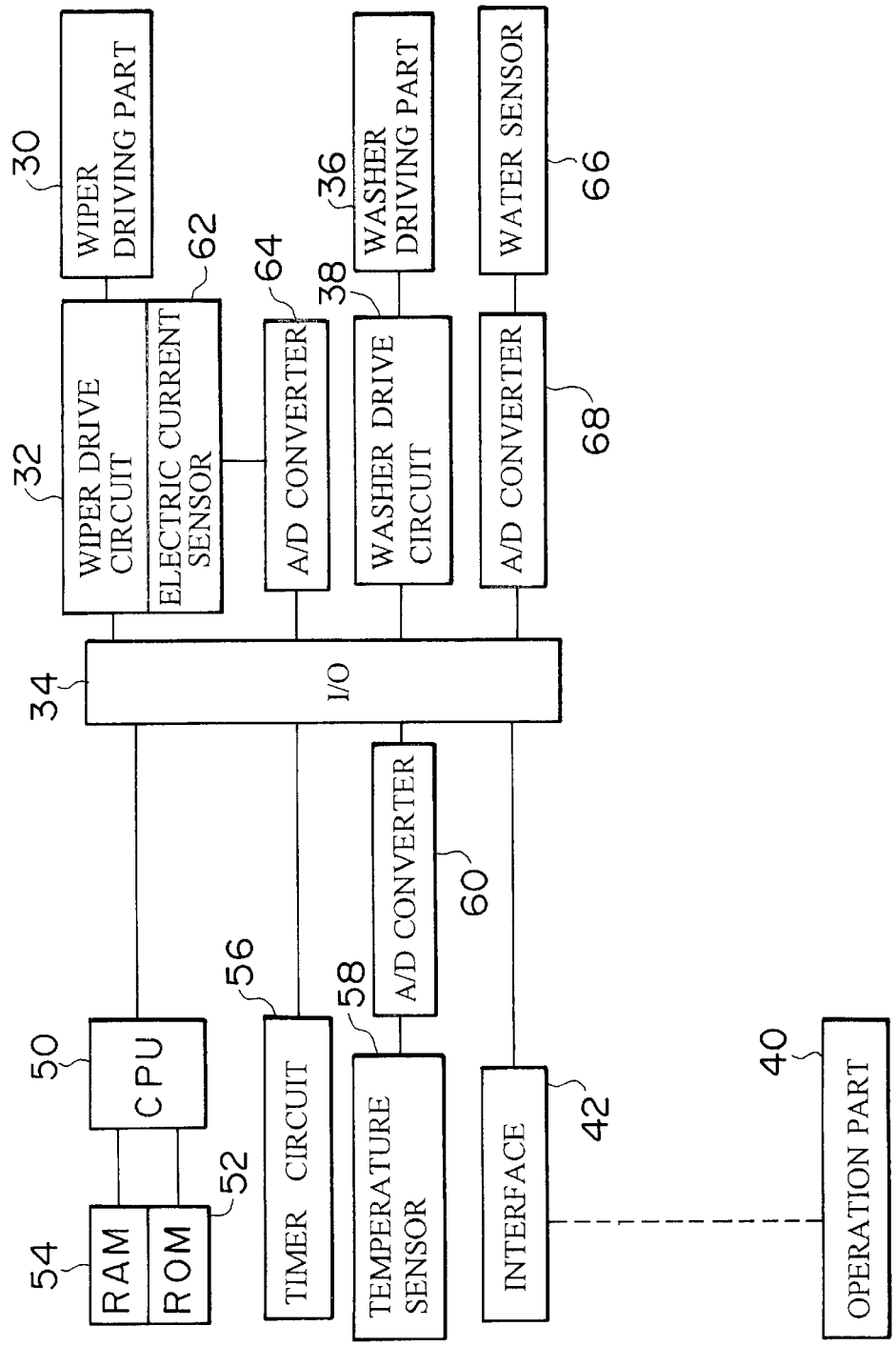
FIG. 2 is a view showing the structure of a control mechanism for a wiper and a window-washing device of the housing in the remote-control pan/tilt head.

A description will now be given of a control mechanism for the wiper 20 and the window-washing device of the housing 14 in the remote-control pan/tilt head 10, which is constructed in the above-mentioned manner. FIG. 2 is a view showing the structure of the control mechanism for the wiper 20 and the window-washing device. In FIG. 2, the structure of the TV camera and the structure of the pan/tilt head 10 except the housing 14 are omitted for the sake of conciseness.

A wiper driving part 30 and a wiper drive circuit 32 are mounted in the housing 14. The wiper 20 on the housing 14 is driven by a drive motor (not shown) in the wiper driving part 30. The wiper drive circuit 32 supplies the drive motor of the wiper driving part 30 with necessary electricity. The wiper drive circuit 32 turns on and off the supply of the power with a predetermined voltage to the wiper driving part 30 in accordance with wiping operation commands, which are transmitted from a CPU 50 in the pan/tilt head controller 12 through an I/O interface 34.

A washer driving part 36 and a washer drive circuit 38 of the window-washing device are mounted in the housing 14. The washer driving part 36 jets the washing liquid to the front window 18 through the nozzles 22 (see FIG. 1), which are placed at the front of the housing 14. The washer drive circuit 38 supplies the washer driving part 36 with necessary electricity. The washer drive circuit 38 turns on and off the supply of the power to the washer driving part 36 in accordance with washing operation commands, which are transmitted from the CPU 50 through the I/O interface 34.

The CPU 50 generates the wiping operation commands and the washing operation commands in accordance with operation of the control members of an operation part 40 in the pan/tilt head controller 12 or with a program processing of the CPU 50. If the operator presses a switch for instructing the wiper 20 to operate, which is provided at the operation part 40, the CPU 50 receives the instruction through an interface 42 and the I/O interface 34, and the CPU 50 accordingly generates the wiping operation command and transmits the wiping operation command to the wiper drive circuit 32 through the I/O interface 34. Likewise, if the operator presses a switch for instructing the window-washing device to operate, which is provided at the operation part 40, the CPU 50 receives the instruction through the interface 42 and the I/O interface 34, and the CPU 50 accordingly generates the washing operation command and transmits the washing operation command to the washer drive circuit 38 through the I/O interface 34. Consequently, the wiper 20 and the window-washing device can be driven by manually operating the operation part 40 of the pan/tilt head controller 12 as the need arises.

On the other hand, the pan/tilt head controller 12 has an automatic wiping mode for automatically controlling the wiper 20 and the window-washing device. If the pan/tilt head controller 12 is turned on the automatic wiping mode by operating the operation part 40, the CPU 50 automatically generates the wiping operation commands and the washing operation commands at predetermined time intervals in accordance with a predetermined control program stored in a ROM 52, and the CPU 50 transmits the wiping operation commands and the washing operation commands to the wiper drive circuit 32 and the washer drive circuit 38, respectively, through the I/O interface 34.

Although described later in further detail, the wiper 20 and the window-washing device are driven automatically at predetermined time intervals in the automatic wiping mode. For example, the automatic wiping mode is used if the pan/tilt head 10 is placed in a cold district, etc. and the pan/tilt head 10 remains unused for a long time. If the pan/tilt head controller 12 is in the automatic wiping mode in the above-mentioned cases, it is possible to prevent a large amount of snow and frost from covering the front window 18 of the housing 14, thus achieving a satisfactory field of view even at an unexpected shooting. A detailed description will later be given of the automatic wiping mode.

The CPU 50 is connected to the ROM 52, which contains the control program; and a RAM 54, in/from which desired data is written/read. The CPU 50 uses the ROM 52 and the RAM 54 in the automatic wiping mode.

A timer circuit 56 is mounted in the pan/tilt head controller 12, and the timer circuit 56 measures the present time and an elapsed time. To control the operation of the wiper 20 in the automatic wiping mode, the CPU 50 acquires the information such as the present time and the elapsed time from the timer circuit 56 through the I/O interface 34. Alternately, the CPU 50 may perform the processing of the timer circuit 56, which can be omitted in this case.

The housing 14 of the pan/tilt head 10 is also provided with a temperature sensor 58, an electric current sensor 62 and a water sensor 66. These sensors function in the automatic wiping mode. The operation of these sensors in the automatic wiping mode will be described later in further detail. The temperature sensor 58 senses the temperature of the front window 18. The electric current sensor 62 measures the quantity of electric current that is supplied to the drive motor for the wiper 20 so as to determine the load that is applied to the wiper 20 while the wiper 20 is driven. The water sensor 66 detects the water on the front window 18 so as to detect whether snow or frost adheres to the front window 18. The water sensor 66 is preferably arranged within the reach of the wiper 20 or at a position where no water collects. The temperature sensor 58, the electric current sensor 62 and the water sensor 66 output detection signals, which are transmitted to the CPU 50, and so on through A/D converters 60, 64, 68 and the I/O interface 34.

Figure 3:
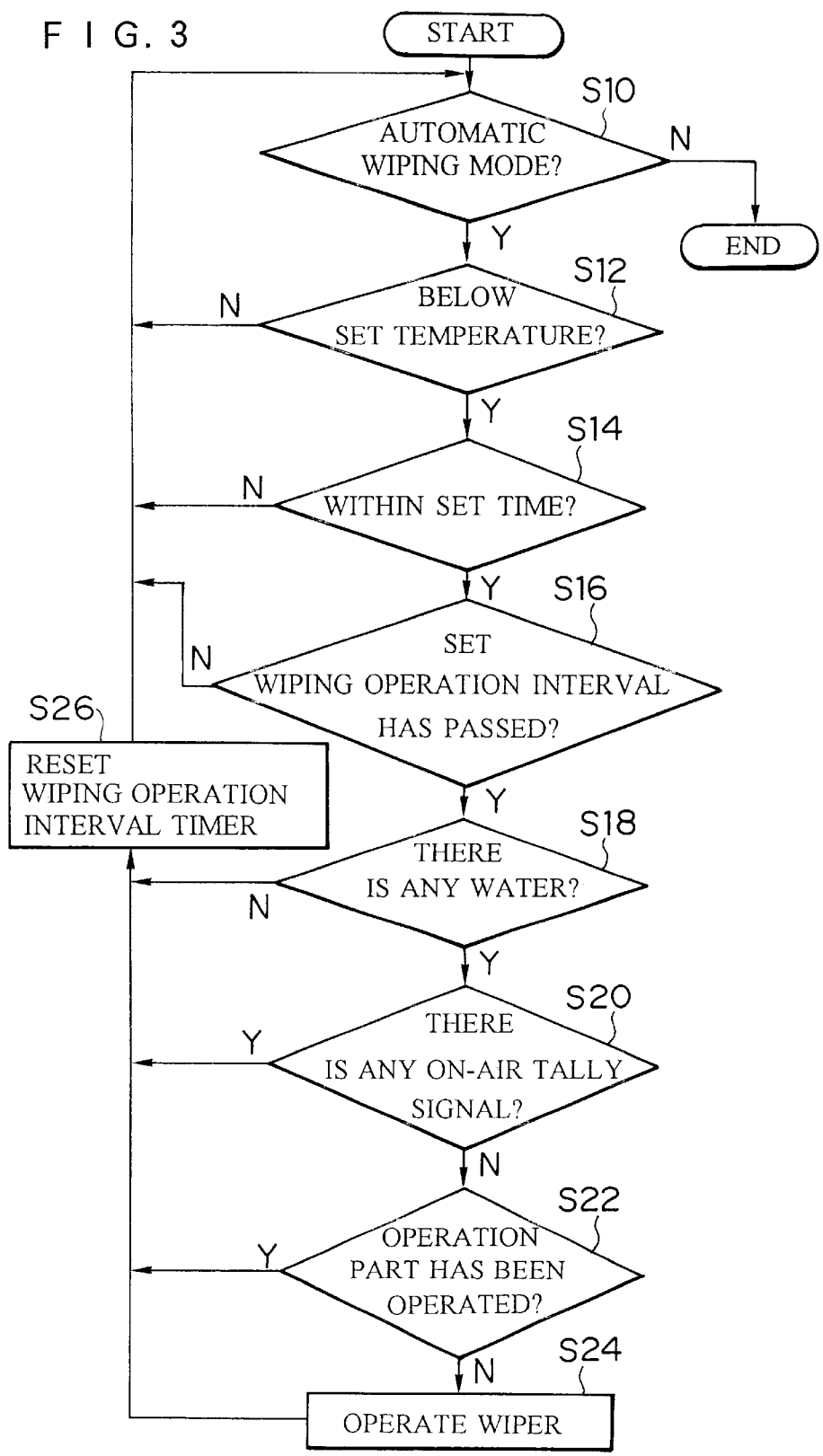
FIG. 3 is a flow chart showing a procedure for operating the wiper in an automatic wiping mode.

A description will be given of how the above-mentioned control mechanism controls the wiper 20 and the window-washing device in the automatic wiping mode. FIG. 3 is a flow chart showing a processing procedure of the CPU 50 while the wiper is unmoving in the automatic wiping mode.

As shown in FIG. 3, the CPU 50 determines whether the automatic wiping mode has been designated by operating the operation part 40 (S10). If yes at S10, the CPU 50 performs the processing as described below. If no at S10, the CPU 50 ends the procedure.

Then, the CPU 50 determines whether a variety of requirements for operating the wiper 20 is satisfied or not. The CPU 50 considers the temperature of the front window 18, the present time, the wiping operation intervals, the presence of water on the front window 18, the presence of an on-air tally signal, and the operation of the pan/tilt head controller 12 as described below. First, the CPU 50 determines whether the temperature sensed by the temperature sensor 58, which is arranged on the front window 18, is below a set temperature or not (S12). The set temperature is the upper limit of the temperature (e.g., 0° C.) at which the snow and the frost are likely to adhere to the front window 18. The set temperature may be recorded in the ROM 52 at the manufacturing stage. The operator may set a desired temperature by operating the control member (a push button, a dial switch, etc.) of the operation part 40 and record the set temperature in the RAM 54. The CPU 50 reads the set temperature from the ROM 52 or the RAM 54 to execute the determination process at S12. If yes at S12, the CPU 50 starts the next determination process, and if no, the CPU 50 returns to S10.

Then, the CPU 50 determines whether the present time is within a set time or not (S14). The set time means the time range in which the automatic wiping mode functions. For example, if the operator designates an starting time (e.g., 11 p.m.) and an ending time (e.g., 7 a.m.) of the automatic wiping mode by operating the operation part 40, the wiper 20 operates in the time range (from 11 p.m. to 7 a.m.). The time set by the operator is recorded in the RAM 54, and the CPU 50 reads the set time from the RAM 54 in this determination process. It is possible to designate either one of the starting time and the ending time and manually start or end the automatic wiping mode. It is also possible to designate a length of the time, in which the automatic wiping mode functions. If yes at S14, the CPU 50 starts the next determination process, and if no, the CPU 50 returns to S10. Alternately, the CPU 50 may end the automatic wiping mode if the present time is without the set time at S14.

Next, the CPU 50 determines whether the elapsed time measured by a wiping operation interval timer exceeds a predetermined wiping operation interval (time interval) or not (S16). This wiping operation interval timer basically indicates the time elapsed since the last operation of the wiper 20 ended. The timer is reset at the start of the automatic wiping mode or on completion of the wiping operation. The timer circuit 56 in FIG. 2 serves as the wiping operation interval timer. The wiper 20 is operated at the wiping operation intervals. For example, if the wiping operation interval is set to 30 minutes, the wiper 20 operates every 30 minutes with other conditions being satisfied. The wiping operation interval may be recorded in the ROM 52 at the manufacturing stage. The operator may set a desired time interval through the operation part 40 and record it in the RAM 54. The CPU 50 reads the wiping operation interval from the ROM 52 or the RAM 54 to execute the determination process at S16. If yes at S16, the CPU 50 starts the next determination process, and if no, the CPU 50 returns to S10.

Then, the CPU 50 determines whether there is any water or not on the front window 18 (S18). The water sensor 66, which is arranged at the front window 18, detects the water on the front window 18. If yes at S18, the CPU 50 determines that snow or frost is likely to adhere to the front window 18 and starts the next determination process. If no at S18, the CPU 50 determines that there is no need for operating the wiper 20 and resets the wiping operation interval timer (S26). Then, the CPU 50 returns to S10. The wiping operation interval timer is reset at S26 in order to prevent the repeat of the determination processes from S18 if it is unnecessary to operate the wiper 20. Besides that, once the CPU 50 determines that there is no snow or frost on the front window 18, the wiper 20 does not have to be operated during the period equivalent to the wiping operation interval.

Then, the CPU 50 determine whether the on-air tally signal is inputted (S20). The on-air tally signal indicates that the image that is presently captured by the TV camera in the housing 14 is on-air. Although not shown in FIG. 2, the on-air tally signal is inputted to the I/O interface 34 of the pan/tilt head controller 12 from an external system. If no at S20, the CPU 50 starts the next determination process. If yes at S20, to prevent the wiper 20 from obstructing the view of the TV camera, the CPU 50 returns to S10 after resetting the wiping operation interval timer (S26).

The presence of the on-air tally signal is thus included in the conditions for determining whether to operate the wiper 20, and it is also possible to arbitrarily set the conditions by a system other than the pan/tilt head controller 12. If the operation of the wiper 20 must be prohibited, a signal indicating the prohibition is inputted to the I/O interface 34 as is the case with the on-air tally signal to thereby prohibit the wiper 20 from operating.

Then, the CPU 50 determines whether any control member at the operation part 40 in the pan/tilt head controller 12 is being operated or not (S22). If yes at S22, to prohibit the wiper 20 from operating during the manual operation, the CPU 50 returns to S10 after resetting the wiping operation interval timer (S26). If no at S22, all the conditions are satisfied and the CPU 50 starts the processing for operating the wiper 20 (S24) as described later in further detail. To operate the wiper 20, the CPU 50 transmits a wiping operation command to the wiper drive circuit 32, which is mounted in the housing 14. On completion of the processing for operating the wiper 20, the CPU 50 resets the wiping operation interval timer (S26), and returns to S10.

The wiper 20 is thereby operated at the predetermined time intervals only if the CPU 50 determines that the wiper 20 has to be operated.

Figure 4:
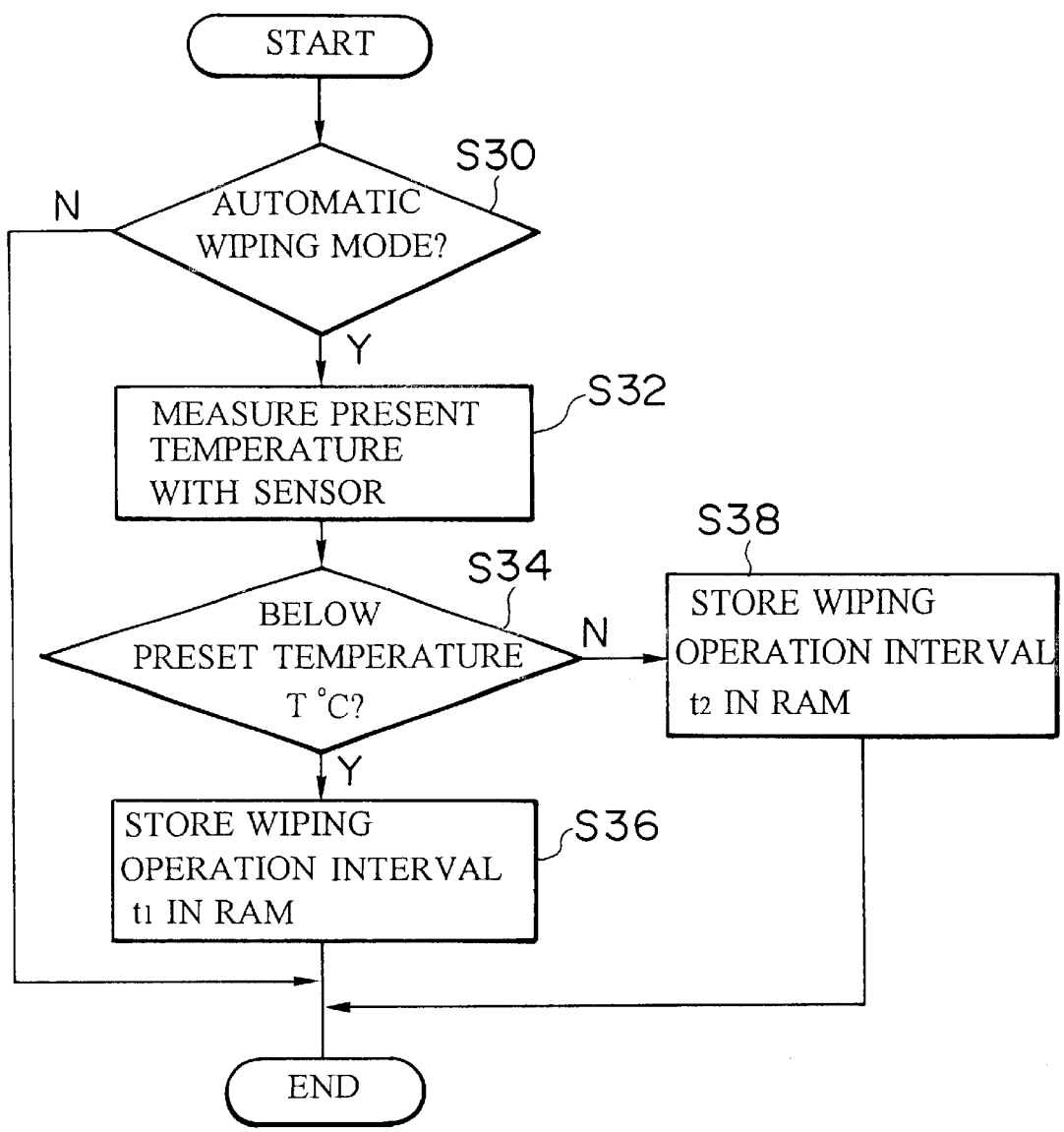
FIG. 4 is a flow chart showing a procedure for setting wiping operation intervals.

In the flow chart of FIG. 3, the wiping operation interval is set to a constant time (see S16), but the wiping operation interval may also be changed automatically according to the temperature of the front window 18. For example, the wiper operates every 20 minutes when the temperature of the front window 18 is equal to or below 0° C., and the wiper operates every 30 minutes when the temperature of the front window 18 is above 0° C. FIG. 4 is a flow chart showing the procedure for setting the wiping operation interval in the case that the wiping operation intervals are changed at two steps according to the temperature of the front window 18. The CPU 50 determines whether the automatic wiping mode functions or not (S30). If yes at S30, the CPU 50 measures the present temperature of the front window 18 with the temperature sensor 58 arranged at the front window 18 (S32). Then, the CPU 50 determines whether the measured temperature is below a preset temperature T° C. or not (S34). If yes at S34, the CPU 50 stores a predetermined wiping operation interval $t_1$, in the RAM 54 (S36). If no at S34, the CPU 50 stores a predetermined wiping operation interval $t_2$ ($>t_1$) in the RAM 54 (S38). The preset temperature T° C. and the wiping operation intervals $t_1$, and $t_2$ may be recorded in the ROM 52 at the manufacturing stage, and the operator may set desired values through the operating part 40 and record them in the RAM 54.

The CPU 50 performs the processing in FIG. 3 on the basis of the wiping operation interval $t_1$, or $t_2$, which is selectively stored in the RAM 54 according to the temperature of the front window 18. Thereby, the wiper 20 operates at relatively short intervals at the low temperature of the front window 18, whereas the wiper 20 operates at relatively long intervals at the high temperature of the front window 18. Thus, the wiper 20 can be operated effectively according to the conditions. In the flow chart of FIG. 3, the wiping operation intervals are changed at two stages, but the wiping operation intervals may be changed at three or more stages according to the temperature of the front window 18. The performance of the processing in FIG. 4 at predetermined time intervals in the automatic wiping mode can effectively change the wiping operation intervals according to the changes in temperature as the time passes.

Alternatively, the wiping operation intervals may be changed in accordance with the presence of the water detected by the water sensor 66 instead of the temperature of the front window 18.

A description will now be given of the procedure for operating the wiper 20 at S24 in FIG. 3 with reference to a flow chart of FIG. 5. As described above, if all the conditions are satisfied in the determination process in FIG. 3, the CPU 50 transmits the wiping operation command to the wiper drive circuit 32 mounted in the housing 14. The wiper drive circuit 32 determines whether the wiping operation command is sent from the CPU 50 or not (S40). If yes at S40, the wiper drive circuit 32 runs the drive motor in the wiper driving part 30 to activate the wiper 20 (S42). While the wiper drive circuit 32 is operating the wiper 20, the CPU 50 repeats a determination process of determining whether to continue or stop the operation of the wiper 20.

First, the CPU 50 determines whether the wiping operation interval is less than a preset value or not (S44). If no at S44, the CPU 50 starts the next processing, and if yes, the CPU 50 stops outputting the wiping operation command and stops the wiper 20 (S52). More specifically, if the wiper 20 operates at short intervals, the operation of the wiper 20 can be stopped in a short time because the processing for operating the wiper at S24 in FIG. 3 is repeated in short cycles.

Then, the CPU 50 determines whether a wiper driving electric current is less than a preset value or not (S46). The wiper driving electric current is supplied to the drive motor for driving the wiper 20, and indicates the load applied to the wiper 20. The wiper driving electric current is measured by the electric current sensor 62 in FIG. 2. The CPU 50 performs the determination process with a measurement signal from the electric current sensor 62. If no at S46, the CPU 50 starts the next determination process, and if yes, the CPU 50 stops the wiper 20 (S52) based on the determination that a small load is applied to the wiper 20 and that the snow and the frost have been removed from the front window 18. If the snow and the frost are removed from the front window 18 by reciprocating the wiper 20 twice, the CPU 50 stops the wiper 20 after the two reciprocation even in the case that the wiper 20 is predetermined to reciprocate three times in one operation. This prevents the wiper 20 from wastefully moving.

Then, the CPU 50 determines whether the temperature of the front window 18 is above a preset temperature or not (S48). The temperature sensor 58 (see FIG. 2), which is arranged at the front window 18, senses the temperature of the front window 18. If no at S48, the CPU 50 starts the next determination process, and if yes, the CPU 50 stops the wiper 20 (S52) based on the determination that the snow and the frost have been removed from the front window 18.

Then, the CPU 50 determines whether the number of wiper operating times has reached a preset value or not (S50). The number of wiper operating times means the number of reciprocation of the wiper 20. The number of wiper operating times may be recorded in the ROM 52 at the manufacturing stage. The operator may arbitrarily set number of wiper operating times through the operation part 40 and record it in the RAM 54. If yes at S50, the CPU 50 returns to S42, and if no, the CPU 50 stops the wiper 20 (S52).

As described above with reference to FIGS. 3, 4, and 5, the wiper 20 operates at the predetermined time intervals in the automatic wiping mode, and stops after reciprocating a predetermined number of times. This prevents a large amount of snow or frost from adhering to the front window 18 without the waste of electricity during the operation of the wiper 20. The wiper 20 is operated as the need arises according to the variety of conditions, and this reduces the consumption of electricity.

A description will now be given of the procedure for operating the window-washing device in synchronism with the wiper 20 in the automatic wiping mode with reference to a flow chart of FIG. 6. As described with reference to FIG. 3, if the conditions are satisfied in the automatic wiping mode, the CPU 50 transmits the wiping operation command to the wiper drive circuit 32. At the same time, the CPU 50 transmits a washing operation command to the washer drive circuit 38. If the washer drive circuit 38 determines at S60 and S62 in FIG. 6 that the automatic wiping mode is ON and that the CPU 50 outputs the wiping operation command, then the washer drive circuit 38 determines whether a set time has passed or not since the last operation of the window-washing device ended (S64). This determination process, however, is not executed when the window-washing device is driven for the first time. The set time may be recorded in the ROM 52 at the manufacturing stage, and the operator may arbitrarily set the time through the operation part 40 and record it in the RAM 54. If no at S64, the washer drive circuit 38 does not operate the washer driving part 36, and only the wiper 20 is then operated by the wiper drive circuit 32 (S70). The procedure for operating the wiper 20 at S70 may be the same with that at S24 in FIG. 3, which has been described with reference to FIG. 5.

On the other hand, if yes at S64, the washer drive circuit 38 operates the washer driving part 36 (S66). Consequently, the washing liquid is jetted to the front window 18. Then, the washer drive circuit 38 resets the washing operation timer (S68), and starts measuring the time to the next operation of the window-washing device.

Then, the wiper drive circuit 32 operates the wiper 20 (S70), and returns to S60. One operating period of the window-washing device is, for example, several seconds, or the time until the wiper 20 stops moving.

Consequently, the window-washing device operates at predetermined time intervals in synchronism with the wiper 20. The operation of the window-washing device facilitates the elimination of the snow and the frost adhering to the front window 18, and prevents the front window 18 from being scratched with dust, etc. even if the wiper 20 is operated when neither snow nor frost adheres to the front window 18.

Moreover, it is possible to set the operating intervals of the window-washing device independently of the operating intervals of the wiper 20. This can reduce the number of operating times for the window-washing device when the wiper 20 operates at short intervals, thus reducing the consumption of the washing liquid (the front window 18 becomes covered with snow, frost or dust only a little if the wiper 20 operates at short intervals, and thus, it is possible to reduce the number of times operating the window-washing device). For example, if the wiper 20 operates every 15 minutes, the window-washing device is operated once while the wiper 20 operates twice (i.e., every 30 minutes). If the wiper 20 operates every 10 minutes, the window-washing device is operated once while the wiper 20 operates three times (i.e., every 30 minutes).

The operating interval of the window-washing device may be set as the minimum or the maximum. If the operating interval of the window-washing device is set at the minimum 30 minutes, the window-washing device operates every 40 minutes when the wiper 20 operates every 20 minutes. If the operating interval of the window-washing device is set at the maximum 30 minutes, the window-washing device operates every 30 minutes when the wiper 20 operates every 15 minutes.

Without setting the operating time interval of the window-washing device, it is possible to set the number of operating times of the wiper 20 while the window-washing device operates once. In this case, the number of operating times may be changed automatically according to the operating intervals of the wiper 20.

In this embodiment, the temperature of the front window 18 is considered for determining whether to operate the wiper 20, but the atmospheric temperature may be considered instead of the temperature of the front window 18.

In this embodiment, the temperature of the front window 18 (or the atmospheric temperature), the time, the wiping operation intervals, the presence of the water on the front window 18, the presence of the on-air tally signal and the manual operation of the pan/tilt head controller 12 are considered for determining whether to operate the wiper as shown in the flow chart of FIG. 3. All these factors, however, should not necessarily be considered, but only one or several factors among them may be considered. In this embodiment, the wiper 20 temporarily stops if the conditions are not satisfied; however, it is also possible to forcibly end the automatic wiping mode without temporarily stopping the wiper 20.

Figure 5:
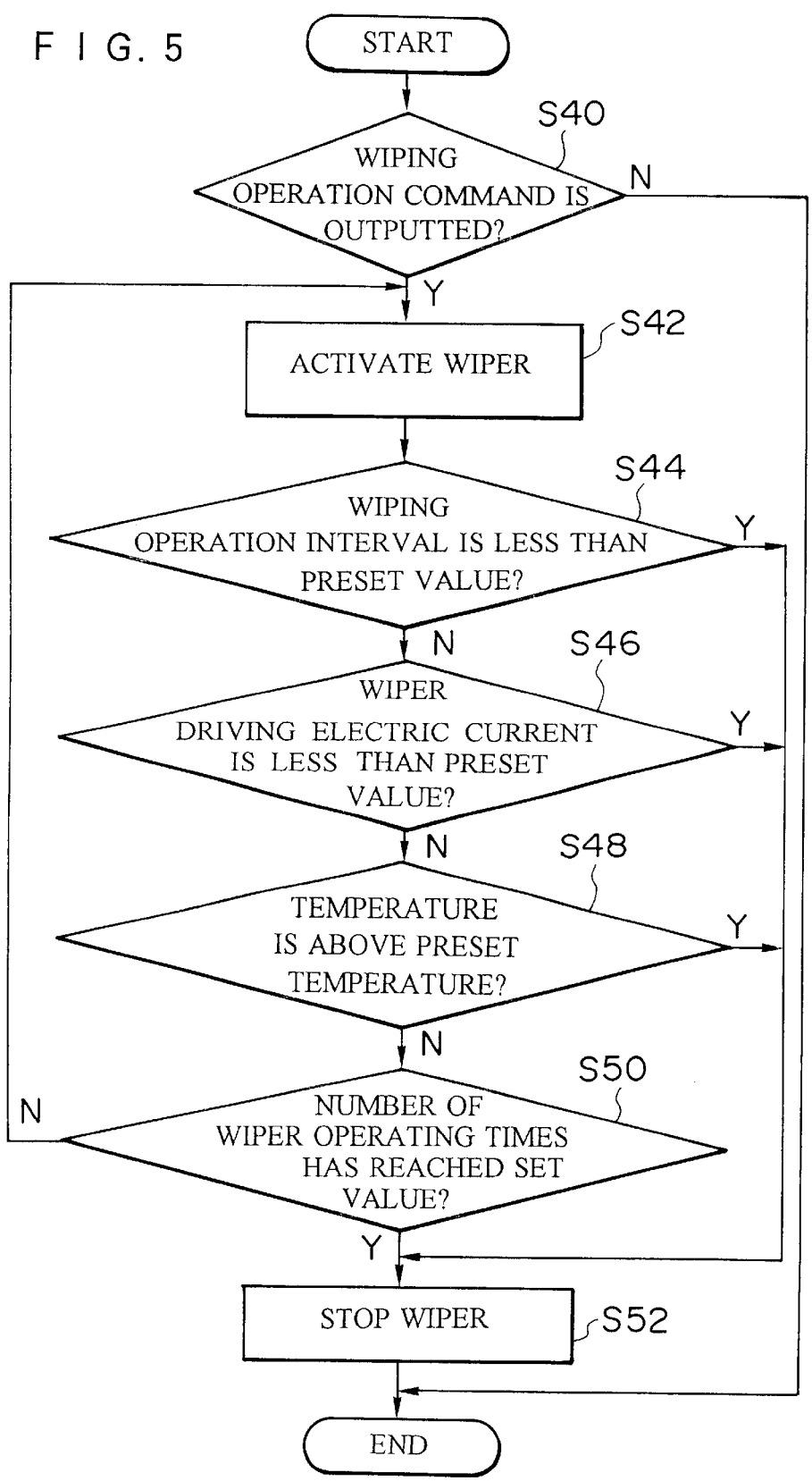
FIG. 5 is a flow chart showing a procedure for activating the wiper.
Figure 6:
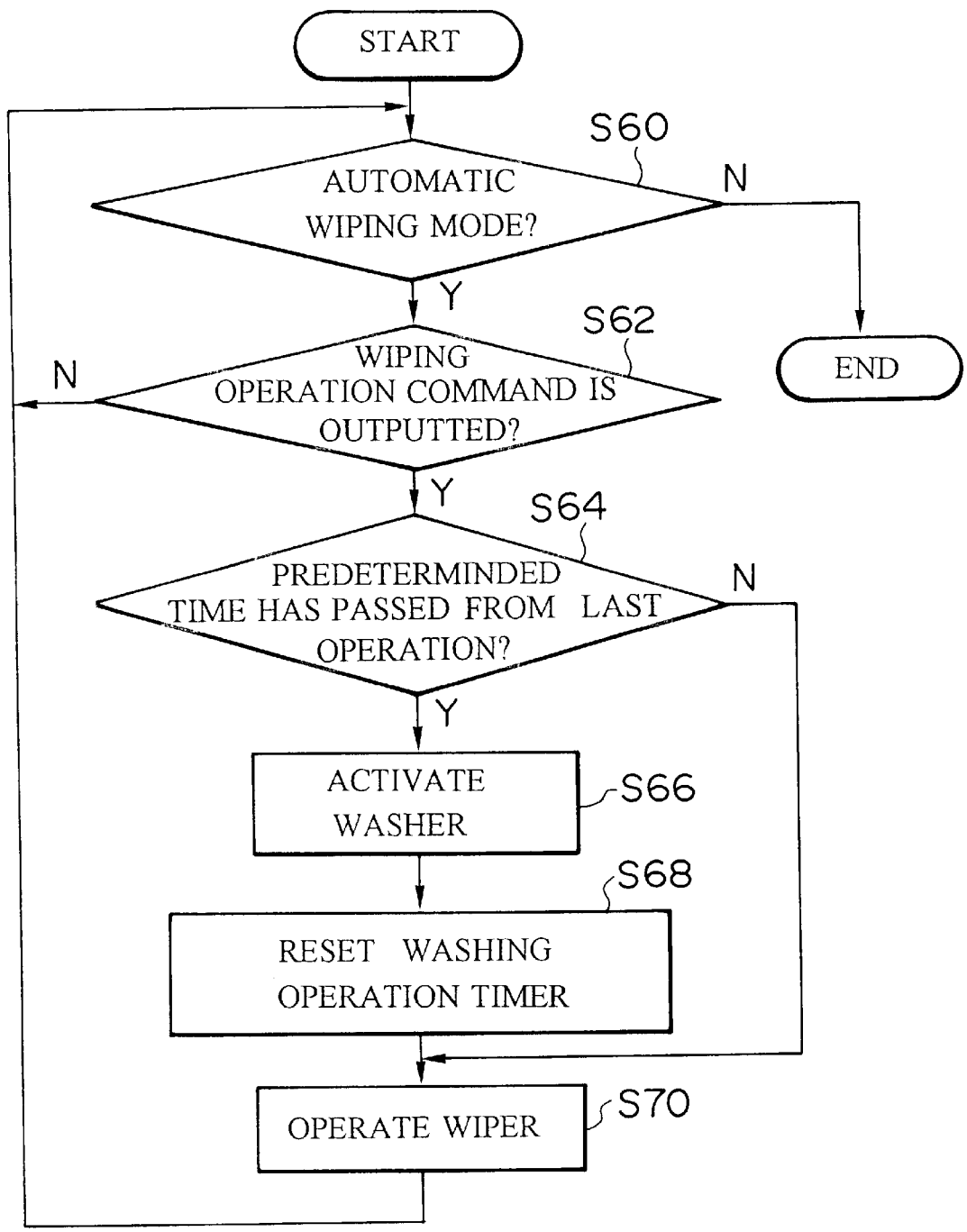
FIG. 6 is a flow chart showing the procedure for operating the window-washing device in an automatic wiping mode.

In this embodiment, the wiping operation intervals, the wiper driving electric current, the temperature of the front window 18 (or the atmospheric temperature) and the number of wiper operating times are considered to determine whether to stop the wiper 20 as shown in the flow chart of FIG. 5. All these factors, however, should not necessarily be considered, but only one or several factors among them may be considered.

In this embodiment, the automatic wiping mode starts when a predetermined switch at the operation part 40 of the pan/tilt head controller 12 is turned on; however, the present invention should not be restricted to this. The automatic wiping mode may start automatically when the atmospheric temperature or the temperature of the front window 18 becomes below a preset temperature (e.g., 0° C.), or when water appears on the front window 18.

In this embodiment, the present invention is applied to the housing 14 of the pan/tilt head 10, which controls the panning, tilting, focusing and zooming operation of the TV camera. The present invention, however, may also be applied to all kinds of housings for the TV camera.

As set forth hereinabove, according to the present invention, the housing for the TV camera with the wiper disposed at the front window to secure the visual field of the TV camera, has the automatic wiping mode for automatically operating the wiper at the predetermined time intervals. Therefore, even if the camera with the housing is placed outdoors and is remained unused under snowfalls and/or low temperature, it is possible to prevent a large amount of snow and frost from adhering to the front window of the housing with only a small amount of electricity by executing the functions of the automatic wiping mode, thus securing a satisfactory field of view even at an unexpected shooting. Therefore, the operator never misses a good opportunity to shoot.

According to the present invention, the washing liquid can be jetted to the front window in synchronism with the activation of the wiper in the automatic wiping mode. This enables the wiper to easily wipe off the snow and the frost from the front window, and prevents the front window from being scratched with dust, etc.

According to the present invention, the wiper can operate in accordance with not only the time but also the atmospheric temperature or the temperature of the front window, the presence of the water on the front window, etc. The consumption of electricity is reduced by operating the wiper only when the temperature is relatively low, water is detected on the front window, or the like, even in the automatic wiping mode.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A housing for a TV camera, comprising:
    a box for containing the TV camera, the box having a window through which the TV camera captures an image;
    a wiper for wiping the window;
    a motor for driving the wiper;
    a temperature sensor for sensing at least one of an atmospheric temperature and a temperature of the window;
    a commanding device for commanding execution of an automatic wiping mode to automatically control the wiper when the temperature sensed by the temperature sensor is below a preset temperature; and
    a wiper controller for operating the wiper at predetermined time intervals by the motor in the automatic wiping mode,
    wherein in each of operations of the wiper at the predetermined time intervals, the wiper controller reciprocates the wiper with a predetermined number of wiper reciprocation times required for wiping off snow and/or frost adhering to the window during each of the predetermined intervals.

2. The housing for the TV camera as defined in claim 1, wherein the wiper controller changes the predetermined number of wiper reciprocation times in each of the operations of the wiper in accordance with the temperature sensed by the temperature sensor.

3. The housing for the TV camera as defined in claim 1, further comprising:
    a load measuring device for measuring a load applied to the motor, wherein the wiper controller changes the predetermined number of wiper reciprocation times in each of the operations of the wiper in accordance with the load applied to the motor measured by the load measuring device.

4. The housing for the TV camera as defined in claim 1, further comprising:
    a washing device for jetting a washing liquid to the window, wherein the wiper controller drives the washing device to jet the washing liquid to the window when the wiper is driven.

5. The housing for the TV camera as defined in claim 1, wherein the wiper controller temporarily stops driving the wiper when the temperature sensed by the temperature sensor is above a preset temperature.

6. The housing for the TV camera as defined in claim 1, wherein the wiper controller finishes the automatic wiping mode when the temperature sensed by the temperature sensor is above a preset temperature.

7. The housing for the TV camera as defined in claim 1, further comprising:
    a water detector for detecting water on the window, wherein the wiper controller temporarily stops driving the wiper when the water detector detects no water on the window.

8. The housing for the TV camera as defined in claim 1, further comprising:
    a water detector for detecting water on the window, wherein the wiper controller finishes the automatic wiping mode when the water detector detects no water on the window.

9. The housing for the TV camera as defined in claim 1, further comprising:
    a shooting operation detector for detecting that the TV camera is shooting, wherein the wiper controller temporarily stops driving the wiper when the shooting operation detector detects that the TV camera is shooting.

10. The housing for the TV camera as defined in claim 1, further comprising:
    a shooting operation detector for detecting that the TV camera is shooting, wherein the wiper controller finishes the automatic wiping mode when the shooting operation detector detects that the TV camera is shooting.

11. The housing for the TV camera as defined in claim 1, further comprising:
    a manual operation detector for detecting that the housing is manually operated, wherein the wiper controller temporarily stops driving the wiper when the manual operation detector detects that the housing is manually operated.

12. The housing for the TV camera as defined in claim 1, further comprising:

a manual operation detector for detecting that the housing is manually operated, wherein the wiper controller finishes the automatic wiping mode when the manual operation detector detects that the housing is manually operated.

13. The housing for the TV camera as defined in claim 1, further comprising:

a load measuring device for measuring a load applied to the motor, wherein the wiper controller temporarily stops driving the wiper when the load applied to the motor measured by the load measuring device is below a predetermined value.

14. The housing for the TV camera as defined in claim 1, wherein the wiper controller starts the automatic wiping mode when the temperature sensed by the temperature sensor is below a preset temperature.

15. The housing for the TV camera as defined in claim 1, further comprising:

a water detector for detecting water on the window, wherein the wiper controller starts the automatic wiping mode when the water detector detects the water on the window.

16. The housing for the TV camera as defined in claim 1, wherein the wiper controller changes the predetermined time intervals in accordance with the temperature sensed by the temperature sensor.

17. The housing for the TV camera as defined in claim 1, further comprising:

a water detector for detecting water on the window, wherein the wiper controller changes the predetermined time intervals in accordance with presence of the water on the window detected by the water detector.

\* \* \* \* \*